US009999171B2

(12) United States Patent
Magarity et al.

(10) Patent No.: US 9,999,171 B2
(45) Date of Patent: Jun. 19, 2018

(54) AGRICULTURAL TILLAGE IMPLEMENT FOLD SEQUENCE CONTROL

(71) Applicant: CNH Industrial America LLC, New Holland, PA (US)

(72) Inventors: Brice Magarity, Deer Creek, IL (US); Kena Shah, Woodridge, IL (US); Dean A. Knobloch, Tucson, AZ (US); John C. Endsley, Washington, IL (US); Matthew R. Sudbrink, Metamora, IL (US); Jason E. Andrews, Goodfield, IL (US); David Schulte, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 15/160,583

(22) Filed: May 20, 2016

(65) Prior Publication Data
US 2017/0332543 A1 Nov. 23, 2017

(51) Int. Cl.
*A01B 73/04* (2006.01)
*A01B 63/00* (2006.01)
*A01B 63/22* (2006.01)

(52) U.S. Cl.
CPC .......... *A01B 73/046* (2013.01); *A01B 63/002* (2013.01); *A01B 63/22* (2013.01)

(58) Field of Classification Search
CPC ....... A01B 73/00; A01B 73/02–73/048; A01B 63/002; A01B 63/22
See application file for complete search history.

(56) References Cited

U.S. PATENT DOCUMENTS

| | | | |
|---|---|---|---|
| 4,286,672 A | 9/1981 | Forsyth et al. | |
| 4,320,805 A | 3/1982 | Winter | |
| 4,700,784 A | 10/1987 | Wiebe et al. | |
| 4,867,245 A * | 9/1989 | Stevens | A01B 73/046 172/311 |
| 5,488,996 A | 2/1996 | Barry et al. | |
| 6,220,366 B1 | 4/2001 | Noonan et al. | |
| 6,305,478 B1 | 10/2001 | Friggstad | |
| 6,382,326 B1 * | 5/2002 | Goins | A01B 63/145 172/239 |
| 6,397,953 B1 | 6/2002 | Ankenman | |
| 6,675,907 B2 * | 1/2004 | Moser | A01L 363/32 111/121 |
| 6,684,962 B1 * | 2/2004 | Lewallen | A01L 363/22 111/57 |
| 6,810,968 B2 | 11/2004 | Myers | |

(Continued)

FOREIGN PATENT DOCUMENTS

WO 2011/151376 A1 12/2011

*Primary Examiner* — Matthew D. Troutman
(74) *Attorney, Agent, or Firm* — Rebecca L. Henkel; Rickard K. DeMille

(57) ABSTRACT

An agricultural tillage implement with a hydraulic system coupled to actuators of foldable wing sections and to actuators of wheel assemblies associated with each wing section. The hydraulic system having a wing sensor detecting an inner wing section being folded and at least one valve coupled to the wing sensor. The valve being activated by the wing sensor enabling a hydraulic fluid flow to the actuators associated with the wheel assemblies of the wing sections causing the wheel assemblies associated with the wing sections to thereby retract.

11 Claims, 7 Drawing Sheets

(56) References Cited

U.S. PATENT DOCUMENTS

| | | |
|---|---|---|
| 6,902,010 B2 | 6/2005 | Shoup |
| 7,073,604 B1 * | 7/2006 | Dobson ................ A01B 73/046 111/57 |
| 7,469,648 B2 | 12/2008 | Bettin |
| 7,478,683 B2 | 1/2009 | Peck et al. |
| 7,921,932 B2 | 4/2011 | Poole |
| 8,047,299 B2 | 11/2011 | Hurtis et al. |
| 8,112,977 B2 | 2/2012 | Priepke |
| 8,141,652 B2 | 3/2012 | Poole et al. |
| 8,505,645 B1 * | 8/2013 | Kelly ................... A01B 73/046 172/311 |
| 8,528,657 B1 | 9/2013 | Rosenboom |
| 9,161,488 B2 * | 10/2015 | Blunier ................ A01B 73/046 |
| 9,200,644 B2 | 12/2015 | Barfels et al. |
| 9,516,796 B2 * | 12/2016 | Sudbrink ................ A01B 3/26 |
| 2006/0090910 A1 | 5/2006 | Houck |
| 2007/0023195 A1 * | 2/2007 | Peck ................... A01B 73/046 172/311 |
| 2010/0051302 A1 | 3/2010 | Steffan et al. |
| 2014/0060035 A1 | 3/2014 | Barfels et al. |
| 2014/0060865 A1 * | 3/2014 | Maro ................... A01B 73/046 172/311 |
| 2014/0060868 A1 | 3/2014 | Blunier et al. |
| 2015/0068177 A1 | 3/2015 | Harkcom et al. |
| 2015/0129254 A1 * | 5/2015 | Sudbrink ................ A01B 3/26 172/1 |
| 2015/0129255 A1 * | 5/2015 | Sudbrink ................ A01B 3/26 172/2 |

* cited by examiner

AGRICULTURAL TILLAGE IMPLEMENT FOLD SEQUENCE CONTROL

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks.

Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

Wheels are often integral with tillage implements and are used for both transportation of the implement, and for depth control of the tillage elements. The prior art includes control systems that raise and lower the wheel assemblies as an entire unit, which can result in interference with components of foldable wing sections as the wing sections are folded.

What is needed in the art is an easy to use system that orchestrates the folding and wheel positions of the implement sections.

SUMMARY OF THE INVENTION

The present invention provides a tillage implement that has several tilling sections with the ability to coordinate the various sections as the sections are being folded.

The invention in one form is directed to an agricultural tillage implement with a hydraulic system coupled to actuators of foldable wing sections and to actuators of wheel assemblies associated with each wing section. The hydraulic system having a wing sensor detecting an inner wing section being folded and at least one valve coupled to the wing sensor. The valve being activated by the wing sensor enabling a hydraulic fluid flow to the actuators associated with the wheel assemblies of the wing sections causing the wheel assemblies associated with the wing sections to thereby retract.

An advantage of the present invention is that the implement has a decreased profile in the transport mode.

Another advantage of the present invention is that the control system choreographs the movement of the wing sections to keep the implement balanced.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
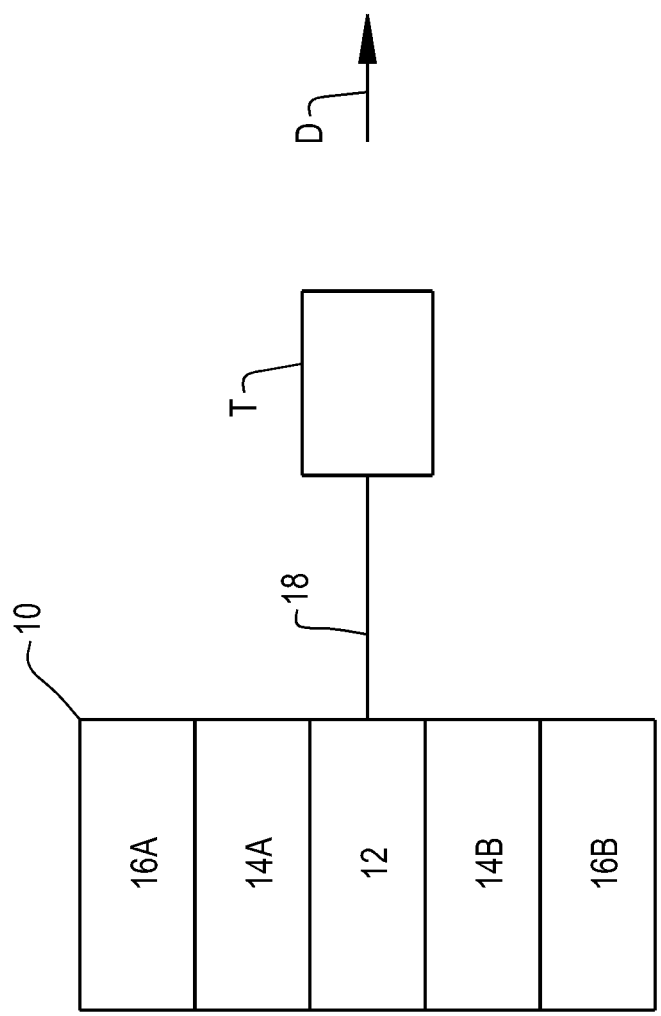
FIG. 1 is a top schematical view of an embodiment of an agricultural tillage implement of the present invention, in the form of a field cultivator, in an unfolded position being pulled by a tractor.

Referring now to the drawings, and more particularly to FIGS. 1-5, there is shown an embodiment of a tillage implement of the present invention. In the illustrated embodiment, the tillage implement is in the form of a field cultivator 10 for tilling and finishing soil prior to seeding. Field cultivator 10 is being pulled by a tractor T in a travel direction D.

Field cultivator 10 is configured as a multi-section field cultivator, and includes a center frame section 12, also referred herein as a main section 12, and a plurality of wing sections 14 and 16. In the illustrated embodiment, field cultivator 10 has a dual-fold configuration with two left wing sections designated 14A and 16A, and two right wing sections designated 14B and 16B. Wing sections 14A and 14B are each inner wing sections, wing sections 16A and 16B are each outer wing sections. Throughout this application the when the suffixes A and B are used they refer to a side of implement 10, and the use of the reference number absent the suffix is meant to refer to both the A and B item.

Center frame section 12 is the center section that is directly towed by a traction unit, such as an agricultural tractor T. A pull hitch 18 extends forward from center frame section 12, and is coupled with the traction unit T in a known manner.

Figure 2:
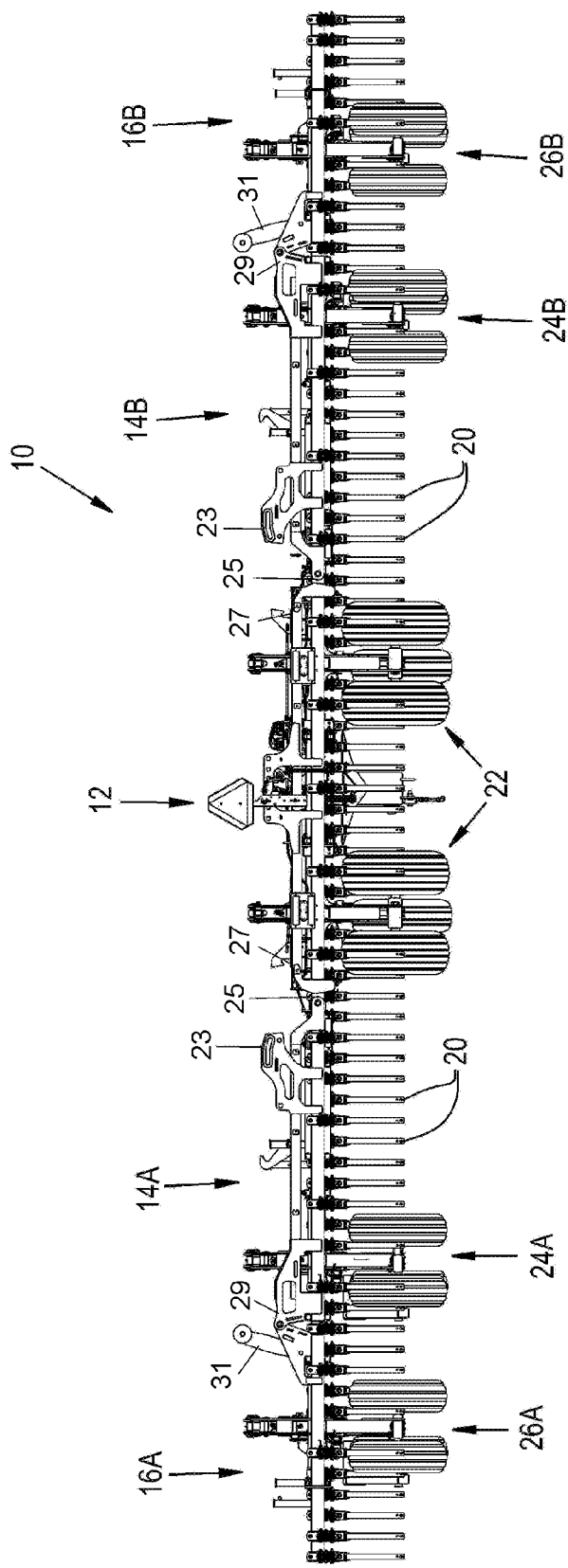
FIG. 2 is a rear view of the field cultivator shown in FIG. 1.

Sections 12-16 typically have cultivator shanks 20 coupled thereto for the cultivating or tilling of the ground. Each shank 20 may have a tilling portion, such as shovels at their lower ends for tilling the soil. Wheel assemblies 22 are coupled to main section 12 and are used for raising and lowering main section 12 with a hydraulic lift cylinder (not specifically visible), during the tilling operation, and is used during the transport mode. Sections 12-16 typically have cultivator shanks 20 coupled thereto for the cultivating or tilling of the ground. Each shank 20 may have a tilling portion, such as shovels at their lower ends for tilling the soil. Wheel assemblies 22 are coupled to main section 12 and are used for raising and lowering main section 12 with a hydraulic lift cylinder (not specifically visible), during the tilling operation, and is used during the transport mode. Left wing section 14A and right wing section 14B each include a bracket 23 positioned a distance from each inner end 25 of each the wing section 14A, 14B, respectively. Center frame section 12 includes a pair of spaced-apart stops 27 (FIG. 2). When the field cultivator 10 is positioned in the folded position in the transport mode, left wing section 14A and right wing section 14B are positioned such that a portion of the bracket 23 on each wing section is positioned against one of the stops 27 (FIG. 5).

Figure 3:
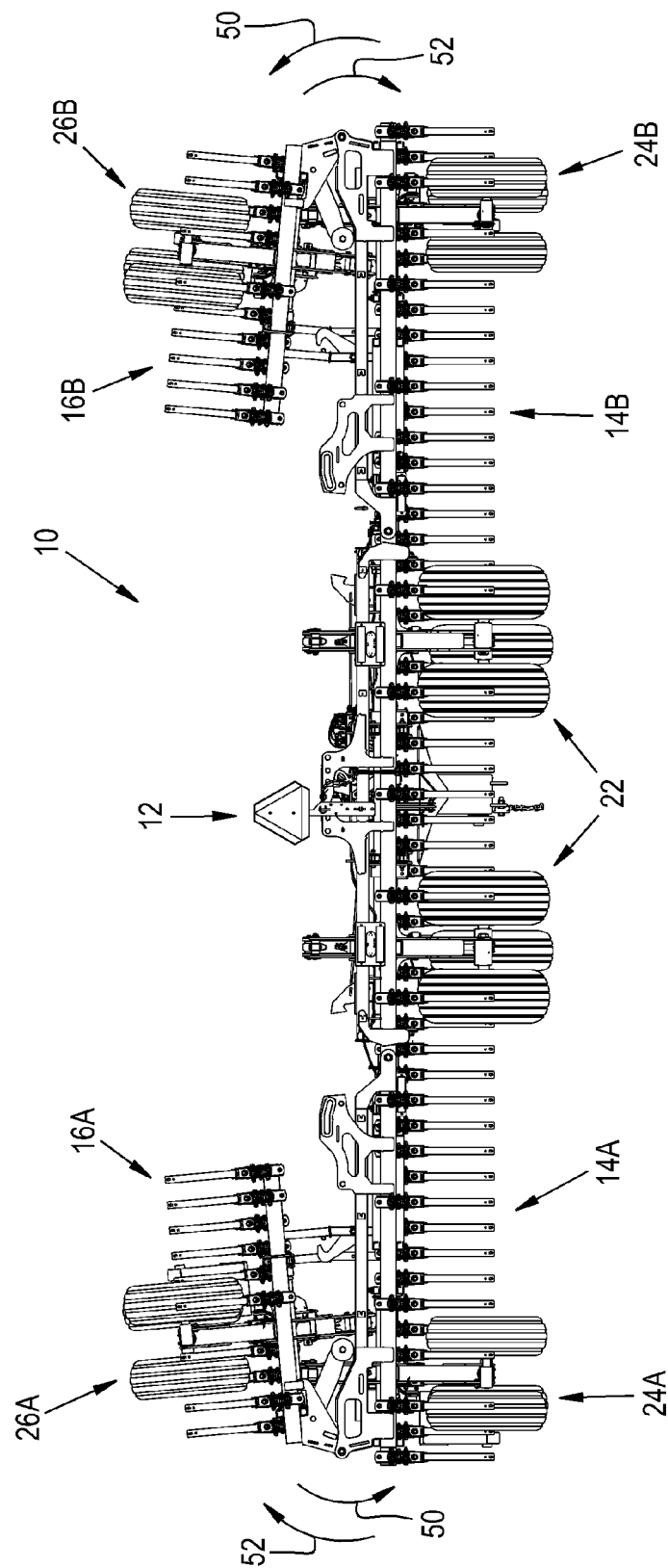
FIG. 3 is another rear view of the field cultivator shown in FIGS. 1-2, with the outer wing sections folded.
Figure 4:
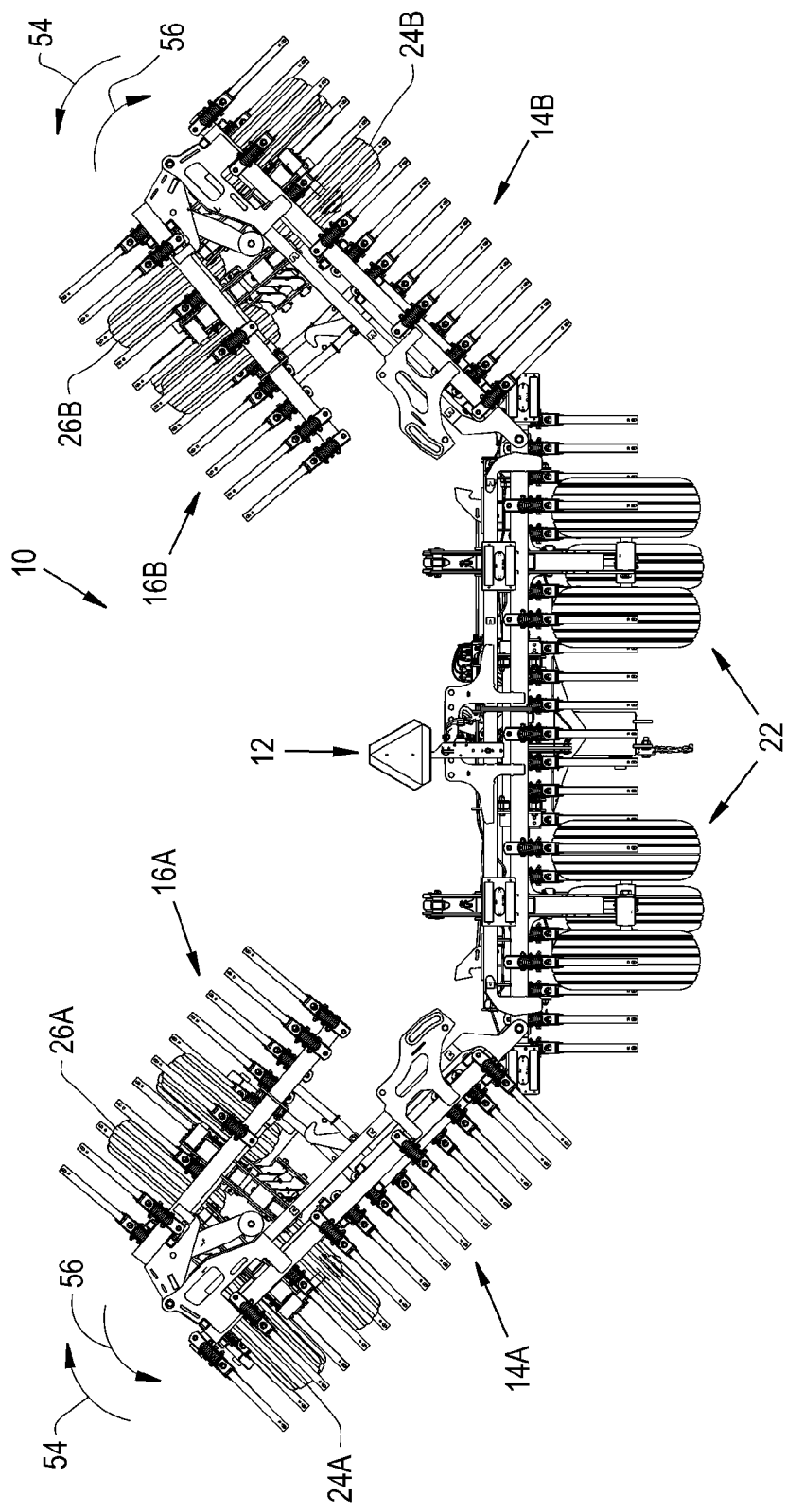
FIG. 4 is yet another rear view of the field cultivator shown in FIGS. 1-3, with the outer wing sections folded and the inner wing sections illustrated at an intermediate position.

During use, it is periodically necessary to move the field cultivator 10 from a tilling mode which is an unfolded (operating) position to a transport mode which is a folded position. First, each outer wing section 16A and 16B is folded laterally inward in a direction 50 and over a respective inner wing section 14A and 14B (FIG. 3). With the outer wing sections 16A and 16B in the folded state, each inner wing section 14A and 14B is then folded in a direction 54 (FIGS. 4 and 5). When the folding operation is detected as seen in FIG. 4, the inner wing sections 14 are approximately 10 degrees or more into the folding process. The detection of folding can also take place at approximately 45 degrees, or half way between the tilling mode and transport mode, wheel assemblies 24 and 26 are retracted, as discussed further later herein, while wheel assemblies 22 remain extended. During the folding process the retraction of wheel assembles 24 and 26 takes place when sensor 28 detects the folding is underway, such as a pivoting upward of approximately 10 degrees, or of approximately 45 degrees, or until the folding of inner wing sections 14 are within 10 degrees of being vertically aligned over main section 12. Hinged brackets 29 are positioned to pivotally couple outer wing section 16A to inner wing section 14A, and outer wing section 16B to inner wing section 14A. A stop rod 31 is positioned next to and extends a distance above each hinged bracket 29 (FIG. 2). Each stop rod 31 is positioned against a frame of its respective inner wing section (14A, 14B) when in the transport mode, as best illustrated in FIG. 5.

Figure 5:
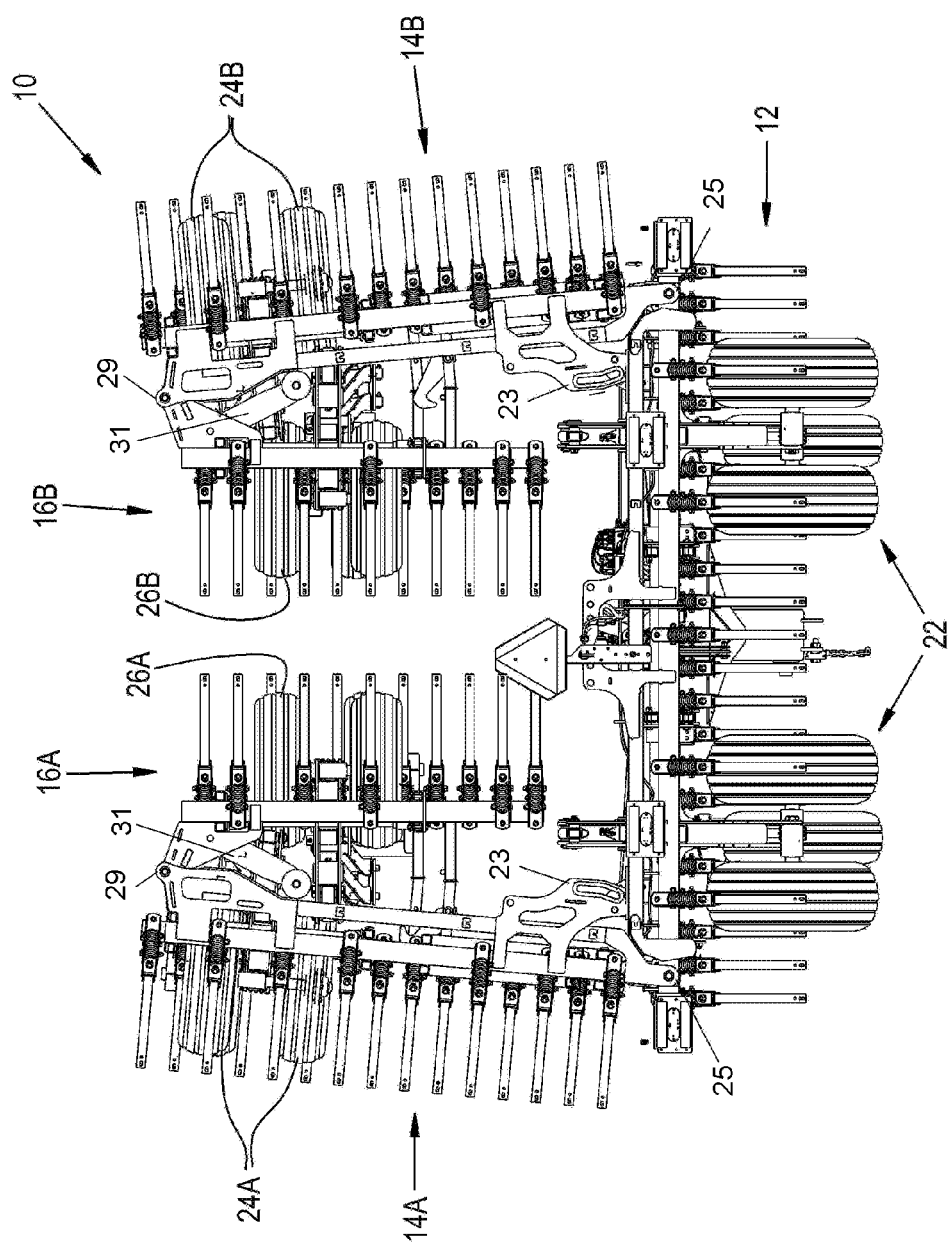
FIG. 5 is still yet another rear view of the field cultivator shown in FIGS. 1-4, with the inner and outer wing sections folded to a transport position.

The outer wing sections 16, and inner wing sections 14 are aligned together in a vertically arrangement over the center frame section 12 when in the folded state (transport mode), as illustrated in FIG. 5, with wheel assemblies 24 and 26 in the fully retracted state. Wing sections 14 and 16 are generally normal in their folded state relative to their position when in the tilling mode. This can vary from normal by 10 degrees, or even by 15 degrees. It is also contemplated that the folding of the inner wing sections 14 could be by approximately 125 degrees.

To unfold the field implement 10 and transform it back to the tilling mode shown in FIGS. 1 and 2 from the transport mode shown in FIG. 5, the folding sequence described above is reversed, with wing sections 14 and 16 moving in direction 56 as shown in FIG. 4, and when moving in this direction wheel assemblies 24 and 26 are extended so that when wheel assembles 24 touch the ground, as shown in FIG. 3, wheel assemblies 24 and 26 are fully extended. Then outer wing sections 16 are pivoted in direction 52, as shown in FIG. 3 to put implement 10 back into a tilling mode as shown in FIGS. 1 and 2. During the unfolding process the extension of wheel assembles 24 and 26 takes place when sensor 28 detects the unfolding is underway, such as a pivoting outward of approximately 10 degrees, or of approximately 45 degrees, or until the unfolding of inner wing sections 14 are within 10 degrees of being aligned with main section 12.

Figure 6:
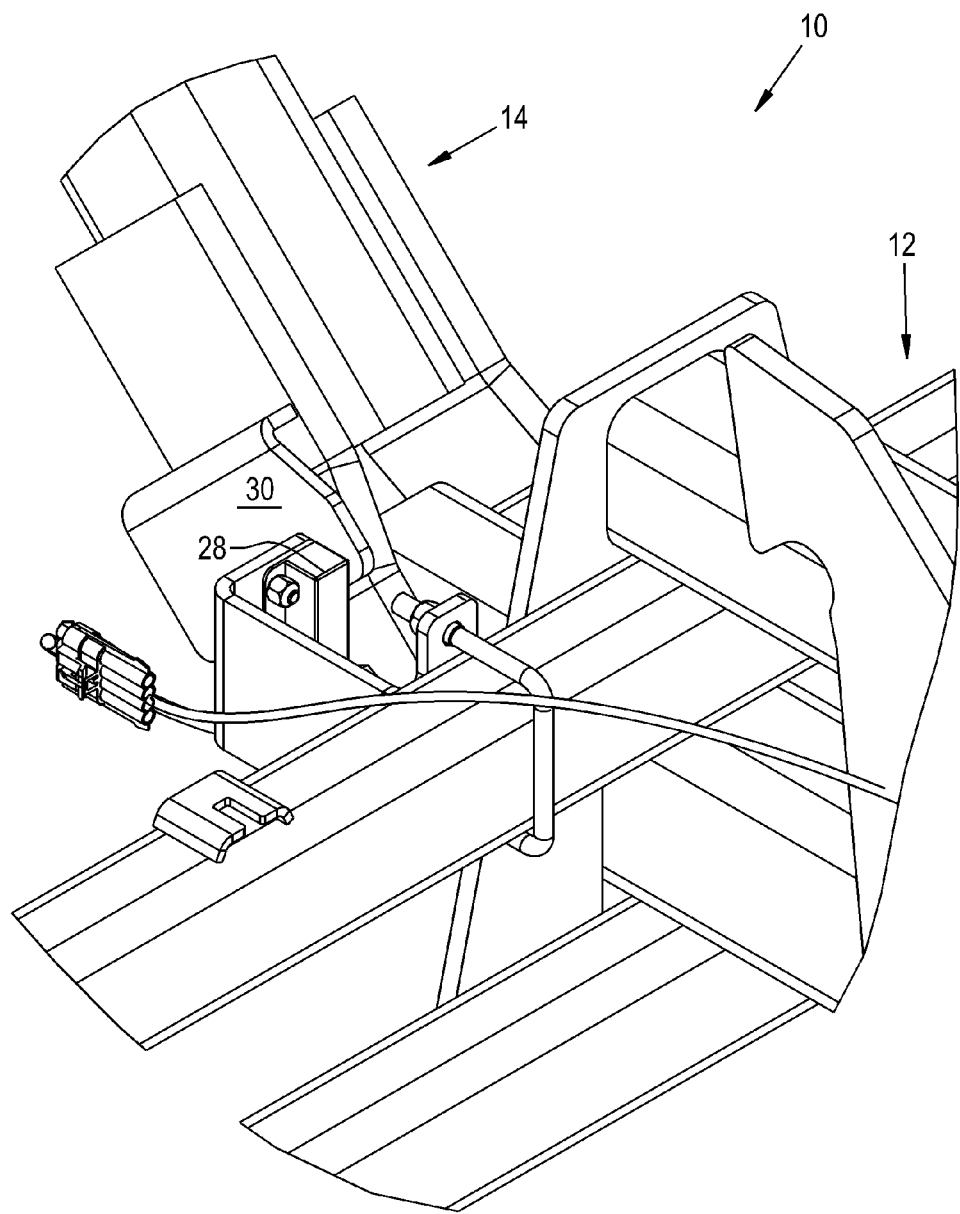
FIG. 6 is a partial perspective view of one of one of the inner wings in an intermediate position, which is more widely illustrated in FIG. 4.
Figure 7:
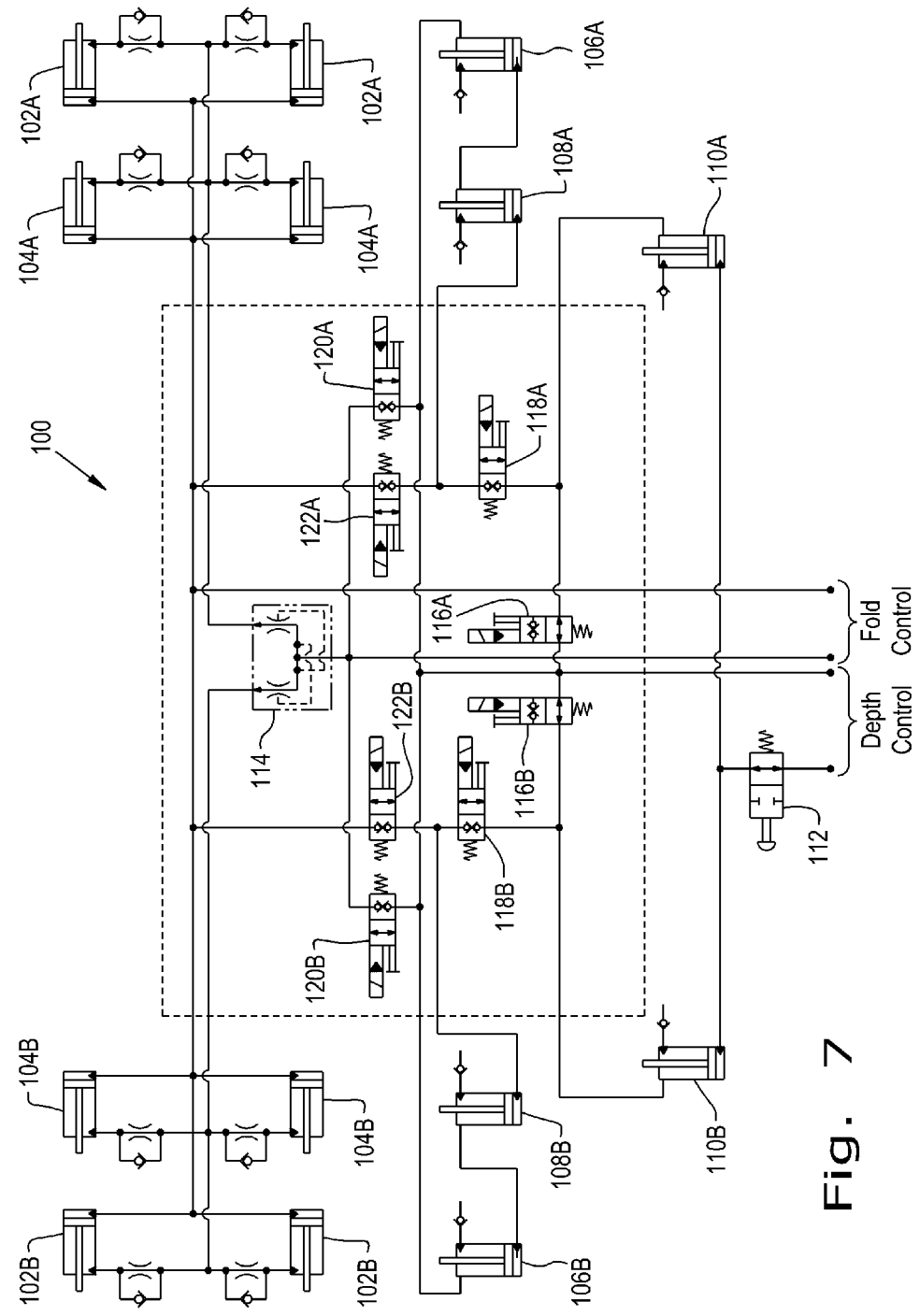
FIG. 7 is a schematical view of a hydraulic system for the tillage implement of FIGS. 1-6.

Now, additionally referring to FIGS. 6 and 7 there is shown further details of implement 10. A hydraulic system 100 controls the depth of shanks 20 during the tilling mode and has a folding control that transitions implement 10 between the tilling mode and the transport mode. A sensor 28 is positioned on one side of main section 12 to detect the folding and unfolding of wing sections 14. Sensor 28 detects the proximity (lack thereof) of plate 30 as the folding (unfolding) of wing section 14 is underway, which sends a signal to hydraulic system 100 to activate and deactivate the valves to retract (extend) wheel assemblies 24 and 26. It is also contemplated that a sensor 28 and plate 30 can be used on both inner wing sections 14. However, in the exemplification illustrated herein only one sensor 28 is used and the flow control valve 114 ensures that the wing sections fold in a uniform manner.

Hydraulic system 100 includes actuators 102, 104, 106, 108, and 110, with the A suffixes corresponding to the A suffixes of the wing sections and the B suffixes likewise corresponding to each other. Actuators 102 pivot the outer wing sections 16. Actuators 104 pivot the inner wing section 14. Actuators 106 extend and retract wheel assemblies 26. Actuators 108 extend and retract wheel assemblies 24. Actuators 110A and B extended and retract wheel assemblies 22.

Hydraulic system 100 additionally includes valves 112, 114, 116, 118, 120, and 122, some of which have suffixes that are associated with each other as discussed above relative to the actuators. Valve 112 allows the depth control function to flow to actuators 106, 108 and 110 during the tilling mode to thereby control the tilling depth of shanks 20. Valve 114 is a proportional control valve that proportions the fluid flow so that actuators 102A and 104A receive substantially the same fluid flow as actuators 102B and 104B during the transitions between the tilling mode and the transport mode. Valves 116 provide a controlled flow therethrough being coupled between the rod side of actuators 110 and the depth control system. When valves 118 are actuated the piston side of actuator 108 is coupled to a line coupled to the rod side of actuator 110. When valves 120 are actuated the rod sides of actuators 106 are coupled to a line that goes to the fold control. When valves 122 are actuated the piston side of actuators 108 is coupled to a line of the fold control.

The present invention advantageously orchestrates the lowering of the profile of each folding wing section in order to lower the overall profile of implement 10 when implement 10 is in the transport mode. The present invention uses a control system to choreograph the transition from the field (or operational) mode to the transport mode, as the height profile of wing sections 14 and 16 is controlled.

During the transition from the tilling mode to the transport mode, actuators 106, 108 and 110 are all used to fully extend wheel assemblies 22, 24 and 26 as shown in FIG. 2, by activating valves 116 and 118 and providing fluid flow by way of the depth control. Valves 116 and 118 can then be deactivated. (With valves 116 and 118 being deactivated during transport and storage then the depth control system is used to keep wheels 22 extended.) Next the folding process is started by supplying fluid flow in the fold control lines to actuators 102 and 104. Since wing sections 16 will require less pressure to move, they will fold first as shown in FIG. 3. Then wing sections 14 will start folding as shown in FIG. 4. When sensor 28 is activated by plate 30 then valves 120 and 122 are activated causing actuators 106 and 108 (which are series hydraulic circuits) to retract, causing wheel assemblies 24 and 26 to retract as shown in FIG. 4. Then when fully folded as shown in FIG. 5, valves 120 and 122 are deactivated to hold wing sections 14 and 16, and wheel assemblies 24 and 26 in the folded/retracted state. A reverse process is taken to transition implement 10 from the transport mode to the tilling mode, using, as appropriate reverse flows in the fold control and depth control lines. As implement 10 unfolds, at some point in the unfolding, valves 120 and 122 are deactivated to disconnect the lift and fold systems to avoid leakage during field operations and to maintain the selected tilling depth position.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a main section including a pull hitch extending in a travel direction including a pair of spaced-apart stops;
a plurality of foldable wing sections including:
a first left wing section pivotally coupled to the main section, the first left wing section including a first left wing bracket positioned thereon;
a second left wing section including a left hinged bracket and an associated left stop rod positioned next to the hinged bracket and extending a distance thereabove when the second left wing section is positioned in a working mode, the second left wing section pivotally coupled to the first left wing section via the left hinged bracket;
a first right wing section pivotally coupled to the main section, the first right wing section including a first right wing bracket positioned thereon; and
a second right wing section including a right hinged bracket and an associated right stop rod positioned next to the hinged bracket and extending a distance thereabove when the second right wing section is positioned in a working mode, the second right wing section pivotally coupled to the first right wing section via the right hinged bracket,
wherein each of the foldable wing sections include an actuator for folding the associated wing section, the first left wing section pivotally connected to the second left wing section, the first right wing section pivotally connected to the second right wing section,
wherein the second wing sections are foldable onto the first wing sections such that the stop rod on each second wing section contacts a frame of the associated first wing section when in a transport mode,
wherein the first wing sections are foldable on to the second wing sections such that in a folded position in the transport mode, a portion of the first left wing bracket on the first left wing section and a portion of the first right wing bracket on the first right wing section contacts one of the stops to hold the first wing section and the second wing section in an upright but non-perpendicular position relative to the main section,
wherein the second wing sections are perpendicular relative to the main section when both first wing sections and second wing sections are folded in the transport mode, and
wherein the second wing sections are not parallel to their associated first wing sections when in the folded transport mode,
a plurality of ground engaging tilling elements coupled to one of the main section and at least one of the plurality of foldable wing sections;
a plurality of wheel assemblies, each wheel assembly including an actuator, the plurality of wheel assemblies including a first plurality of wheel assemblies associated with the main section and a second plurality of wheel assemblies associated with the plurality of wing sections; and
a hydraulic system coupled to the actuators of the wing sections and the actuators of the wheel assemblies, the hydraulic system including:
a wing sensor detecting the wing sections being folded; and
at least one valve coupled to the wing sensor, the at least one valve being activated by the wing sensor enabling a hydraulic fluid flow to the actuators associated with the wheel assemblies of the wing sections causing the wheel assemblies associated with the wing sections to thereby retract.

2. The agricultural tillage implement of claim 1, wherein the at least one valve includes a first valve and a second valve, the first valve being coupled to the actuators associated with the wheel assemblies of the right wing sections causing the wheel assemblies associated with the right wing sections to thereby retract, the second valve being coupled to the actuators associated with the wheel assemblies of the left wing sections causing the wheel assemblies associated with the left wing sections to thereby retract.

3. The agricultural tillage implement of claim 2, wherein the first left wing section is an outer left wing section, the second left wing section is an inner left wing section, the first outer right wing section is an outer right wing section, and the second right wing section is an inner right wing section.

4. The agricultural tillage implement of claim 1, wherein the second wing sections are parallel to each other when in the transport mode.

5. The agricultural tillage implement of claim 1, wherein the wing sensor is triggered when the respective wings are at least approximately 10 degrees pivoted between the working mode and the transport mode.

6. The agricultural tillage implement of claim 5, wherein the wing sensor is triggered when the respective wings are raised by approximately 45 degrees of rotation.

7. The agricultural tillage implement of claim 1, wherein as the implement transitions between the transport mode and the working mode the wing sensor detects an unfolding of the wing sections triggering a hydraulic fluid flow to the actuators associated with the wheel assemblies of the wing sections causing the wheel assemblies associated with the wing sections to thereby extend.

8. The agricultural tillage implement of claim 7, wherein the wheel assemblies of the wing sections remain extended until the implement is in the working mode, then they are adjusted by a depth control system.

9. The agricultural tillage implement of claim 7, wherein the wing sensor is triggered when the respective wings are at least approximately 10 degrees pivoted between the transport mode and the working mode as the wing sections are unfolded.

10. The agricultural tillage implement of claim 7, wherein the wing sensor is triggered when the respective wings are lowered by approximately 45 degrees of rotation.

11. The agricultural tillage implement of claim 1, wherein the actuators of the wheel assemblies of the left wing sections are in a series hydraulic circuit, and the actuators of the wheel assemblies of the right wing sections are in a different series hydraulic circuit.

* * * * *